United States Patent
Chandrasekaran et al.

(10) Patent No.: US 12,248,493 B1
(45) Date of Patent: Mar. 11, 2025

(54) AUTOMATICALLY EVOLVING TENANT MODEL SCHEMA IN DATA LAKE IN RESPONSE TO SOURCE SYSTEM CHANGES

(71) Applicant: SAP SE, Walldorf (DE)

(72) Inventors: Vengateswaran Chandrasekaran, Trichy (IN); Panish Ramakrishna, Bangalore (IN); Prithvi Krishna Thodla Chandrasekhar, Pleasanton, CA (US); Arasan Rajendren, San Diego, CA (US); Jay Sardhara, Fremont, CA (US); Sriram Narasimhan, Cedar Park, TX (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/543,070

(22) Filed: Dec. 18, 2023

(51) Int. Cl.
*G06F 16/00* (2019.01)
*G06F 16/25* (2019.01)

(52) U.S. Cl.
CPC .................. *G06F 16/254* (2019.01)

(58) Field of Classification Search
CPC .................................................. G06F 16/254
See application file for complete search history.

(56) References Cited

U.S. PATENT DOCUMENTS

| | | | |
|---|---|---|---|
| 2018/0173774 A1* | 6/2018 | McPherson | G06F 16/2393 |
| 2019/0318272 A1* | 10/2019 | Sassin | G06N 20/00 |
| 2021/0271686 A1* | 9/2021 | Abdul Rasheed | G06F 11/1451 |
| 2022/0350813 A1* | 11/2022 | Ticehurst | G06F 16/254 |
| 2022/0414112 A1 | 12/2022 | Chandrasekaran et al. | |
| 2024/0296082 A1* | 9/2024 | Waller | G06F 9/547 |

* cited by examiner

*Primary Examiner* — Paul Kim
(74) *Attorney, Agent, or Firm* — Fish & Richardson P.C.

(57) ABSTRACT

Methods, systems, and computer-readable storage media for generating an expected configuration checksum based on a configuration file associated with an ETL job, the ETL job being executable to provide a target entity for consumption by one or more consuming applications, the target entity including data of one or more source entities; retrieving an ETL timestamp indicating a last time that the ETL job was executed, and determining, based on one of the expected configuration checksum and the ETL timestamp, that a target data schema of the target entity is to be updated, and in response, providing target metadata for the target entity and updating the target data schema based on the target metadata to provide an updated target data schema.

20 Claims, 4 Drawing Sheets

AUTOMATICALLY EVOLVING TENANT MODEL SCHEMA IN DATA LAKE IN RESPONSE TO SOURCE SYSTEM CHANGES

BACKGROUND

Enterprises execute a multitude of workflows, each including a series of underlying tasks, in order to perform enterprise operations. Execution of workflows can be performed across multiple data centers, systems, and platforms. For example, workflows can be executed within and/or across an enterprise resource planning (ERP) system, a human capital management (HCM) system, and a customer relationship management (CRM) system, to name a few. Each can be considered a source system, which stores data generated therein. Data from multiple source systems can be aggregated to perform certain functionality. For example, data from multiple source systems can be used by a data analytics system and/or a machine learning (ML) system (e.g., to train ML models). Data from multiple source systems can be aggregated in a data lake, which can be described as a type of data repository that is configured to store data in a natural or raw format such as, for example, files, binary large objects (BLOBs), and the like. Data stored in the data lake may be made available for a variety of applications including, for example, reporting, visualization, analytics, and ML.

SUMMARY

Implementations of the present disclosure are directed to automatic adaptation of data models of consuming applications that consume source entities of source systems. More particularly, implementations of the present disclosure are directed to detecting changes to data schema of source systems and/or changes to requirements of consuming applications and updating a data model of a consuming application in response to changes.

In some implementations, actions include generating an expected configuration checksum based on a configuration file associated with an ETL job, the ETL job being executable to provide a target entity for consumption by one or more consuming applications, the target entity including data of one or more source entities; retrieving an ETL timestamp indicating a last time that the ETL job was executed, and determining, based on one of the expected configuration checksum and the ETL timestamp, that a target data schema of the target entity is to be updated, and in response, providing target metadata for the target entity and updating the target data schema based on the target metadata to provide an updated target data schema. Other implementations of this aspect include corresponding systems, apparatus, and computer programs, configured to perform the actions of the methods, encoded on computer storage devices.

These and other implementations can each optionally include one or more of the following features: actions further include executing the ETL job using the updated target schema; the updated target schema is generated by a schema evolution service that executes update instructions; generating the expected configuration checksum includes processing a set of fields provided for in the configuration file through a hash function; providing target metadata for the target entity includes retrieving source metadata of each of the one or more source entities and generating the target metadata at least partially based on the source metadata; determining that the target data schema of the target entity is to be updated includes determining that the expected configuration checksum is different from a stored checksum; and determining that the target data schema of the target entity is to be updated includes determining that the ETL timestamp is earlier than a timestamp representing an update of a source data schema of at least one of the source entities.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to automatic adaptation of data models of consuming applications that consume source entities of source systems. More particularly, implementations of the present disclosure are directed to detecting changes to data schema of source systems and/or changes to requirements of consuming applications and updating a data model of a consuming application in response to changes. Implementations can include actions of generating an expected configuration checksum based on a configuration file associated with an extraction, transformation, and loading (ETL) job, the ETL job being executable to provide a target entity for consumption by one or more consuming applications, the target entity including data of one or more source entities; retrieving an ETL timestamp indicating a last time that the ETL job was executed, and determining, based on one of the expected configuration checksum and the ETL timestamp, that a target data schema of the target entity is to be updated, and in response, providing target metadata for the target entity and updating the target data schema based on the target metadata to provide an updated target data schema.

To provide further context for implementations of the present disclosure, and as introduced above, software systems can be provisioned by software vendors to enable enterprises to conduct operations. Software systems can include various applications that provide functionality for execution of enterprise operations. For example, workflows can be executed within and/or across an enterprise resource planning (ERP) system, a human capital management (HCM) system, and a customer relationship management (CRM) system, to name a few. Each can be considered a source system, which stores data generated therein. In some examples, the data is representative of an entity, which, in a source system, can be referred to as a source entity. Example entities can include, without limitation, invoices, purchase orders, employee records, and the like.

Data in each source system is structured and stored based on a respective source data schema. The source data schema defines one or more datatypes, which can be represented as tables (in the case of a relational database), and can specify the quantity, type, and contents of the fields for each datatype. In some examples, the source data schema can specify relationships between two or more datatypes. Over the course of execution of operations, data (often significant amounts of data) is generated and stored.

The source data schema of a source entity can include a static portion, referred to as a static schema, and a flexible portion, referred to as a flex schema. In some examples, the source data schema of the source entity can change over time. For example, the static schema can be changed by an upgrade to the source application. As another example, the flex schema can be changed due to customization by an end user.

Data from multiple source systems can be aggregated to perform certain functionality. For example, data from multiple source systems can be aggregated in a data lake, which can be described as a type of data repository that is configured to store data in a natural or raw format such as, for example, files, binary large objects (BLOBs), and the like. Data stored in the data lake may be made available for a variety of downstream applications provided in one or more target systems. In some examples, a target system can execute one or more consuming applications, which can include, for example, reporting, visualization, analytics, and machine learning (ML). That is, a consuming application consumes data stored in the data lake. As a non-limiting example, a consuming application can include a ML application that trains ML models using data stored in the data lake. For example, data from the data lake can be retrieved by the ML application and can be used as training data to train ML models. As another non-limiting example, a consuming application can include a data analytics application that processes data from the data lake to generate analytics data.

In some examples, data that is to be used by a consuming application is transformed to conform to a data model of the consuming application. That is, the data can be converted to a target entity that is defined by a data model which conforms to a target data schema. Here, conceptually, the target data schema is the definition of a data model in an abstract manner, and defines data types, structures, and relationships. Physical manifestation of the data model results from deployment into a data store (e.g., database) through generation of data objects (e.g., target entities) as runtime representations. An example data model can include a core data services (CDS) model provided by SAP SE of Walldorf, Germany. In some examples, CDS models are provided using a schema notation, referred to as a core schema notation (CSN), which is an open specification derived from the Javascript object notation (JSON) schema. CDS models can be described as plain JavaScript objects that comply with CSN. In some examples, an ETL system can extract the data from the data lake, transform the data to a target entity based on the target data schema of a data model, and load the target entity for consumption by the consuming application.

It can occur, however, that a data model of the consuming application, and thus the underlying target data schema, needs to adapt. For example, the data model needs to adapt in response to a change in the static schema, a change in the flex schema, and/or changes to requirements of the consuming application (e.g., new product requirements of the consuming application, such as addition of fields and/or changes to ETL configurations).

In view of the above context, implementations of the present disclosure provide for automatic adaptation of data models of consuming applications. As described in further detail herein, a source system sends data to a data lake and includes a checksum that is calculated based on metadata of the data. At least a portion of the metadata is descriptive of a source data schema of the data. In some implementations, the checksum includes multiple parts, a first part that is provided as a checksum of metadata descriptive of a static schema and a second part that is provided as a checksum of metadata descriptive of a flex schema. In some examples, the checksum is provided in a format of checksum_static: checksum_flex.

In some implementations, the checksum is compared to a stored checksum to determine whether the checksum is different from the stored checksum. In some examples, the stored checksum is based on metadata of the source data schema at a first point in time ($t_1$), and the received checksum is based on metadata of the source data schema at a second point in time ($t_2$). If a change is detected, the latest version of the source data schema is retrieved from the source system and is added, with the checksum, to a metadata service that is maintained (e.g., in a data lake). For example, and as described in further detail herein, the metadata service maintains a record of each source data schema as it changes over time and associated checksum. In response to the change, an update is issued to target data schema of data models of any consuming applications that use the source data.

Figure 1:
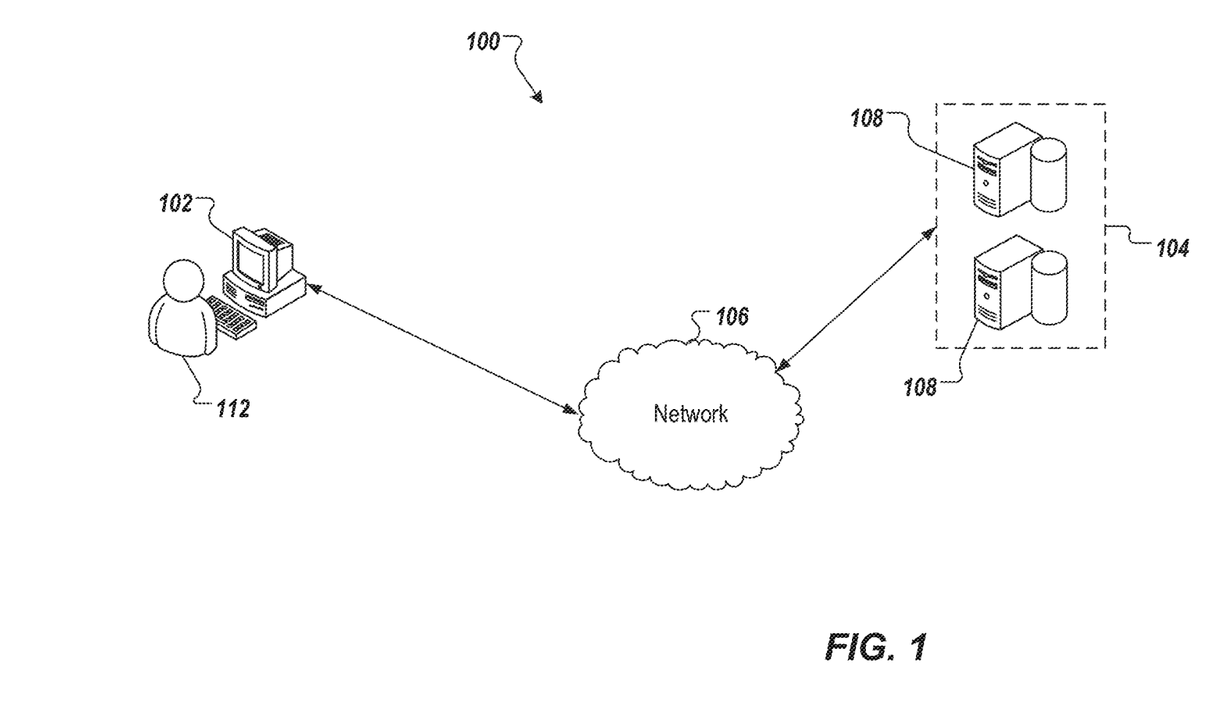
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a source system, a data lake, and a target system that provides a consuming application. In some examples, and as described in further detail herein, a source entity of the source system is stored to the data lake for consumption by the consuming application. For example, and as discussed above, an ETL process can be executed to provide a target entity that conforms to a data model (e.g., CDS model) of the consuming application. In some implementations, and as described in further detail herein, the data model of the consuming application is automatically adapted in response to one or more changes to a source entity (e.g., changes to the static schema and/or changes to the flex schema of the source entity).

Figure 2:
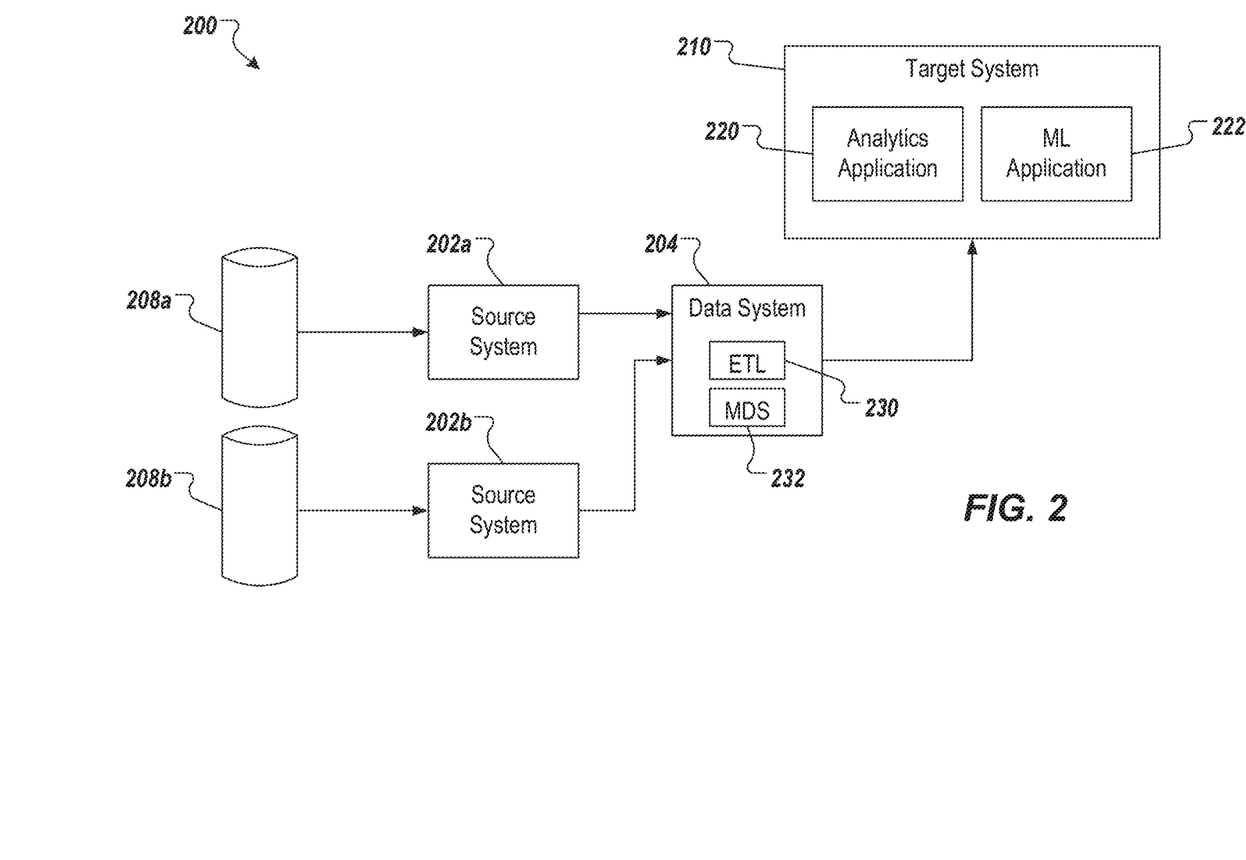
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a source system 202*a*, a source system 202*b*, a data system 204, a datastore 208*a*, a datastore 208*b*, and a target system 210. The target system 210 includes an analytics application 220 and a ML application 222. Although two source systems are depicted in the example of FIG. 2, it is contemplated that any appropriate number of source systems can be provided. In the context of the present disclosure, the analytics system 220 and the ML system 222 are each consuming applications that consume data stored in the data lake system 204. Although two consuming applications are depicted in the example of FIG. 2, it is contemplated that any appropriate number of consuming applications can be provided.

In the example of FIG. 2, the data system 204 includes an ETL system 230 and a metadata service 232. In some examples, the ETL system 230 is configured to execute ETL jobs, each ETL job ingesting one or more source entities from one or more of the source systems 202*a*, 202*b* for storage within the data system 204 (e.g., within a data lake of the data system 204). In some examples, the data system 204 detects one or more changes that require adaptation of a data model of a consuming application and, in response to detecting a change, initiates adaptation (updating) of the data model responsive to the change(s).

In accordance with implementations of the present disclosure, each of the source systems 202*a*, 202*b* generates and maintains one or more source entities, each source entity being data that conforms to a source data schema. An example source entity can include an invoice that is defined by a source data schema and is populated with data (e.g., invoices number, date, payee, payor, address, amount, reference number, etc.). In some examples, a source entity can be provided to the data system 204 as a data packet. An example data packet can be provided as:

| Example Data Packet |
|---|
| Realm                              Entity_Type<br>checksum_static:checksum_flex<br>Entity Data JSON<br>{ . . . . . .<br>. . . } |

In some examples, a realm specifies a particular instance of an application. Example realms can include, without limitation, development, test, and production. For example, a production realm indicates applications that are executed in a production environment for real-world data generation. As another example, a test realm indicates applications that are executed in a test environment to test application functionality and the like.

In some implementations, the data packet of a source entity is received by an ingestion sub-system (e.g., of the adaptation system 230). In some examples, a metadata service (e.g., of the adaptation system 230) maintains a data schema store for source entities received from source systems. In some examples, for each source entity received, the data schema store stores the source data schema of the source entity and the checksum (checksum_static:checksum_flex) of the data schema, which are indexed by the pair [Entity_Type, Realm] for the source schema. In some examples, the source data schema is stored with the checksum and a timestamp that indicates when the source data schema was stored. Here, the timestamp can also indicate when the source data schema was last updated in the metadata service.

In some examples, in response to receiving a data packet, the ingestion sub-system determines whether a source data schema of the source entity that is represented by the data packet is stored in the metadata service. For example, the ingestion sub-system queries the metadata service using the pair [Entity_Type, Realm] to determine whether a source data schema is stored for the source entity. If a source data schema is not stored for the source entity (e.g., the first time the source entity is received), the source data schema is stored by the metadata service with a timestamp. If a source data schema is stored for the source entity, the checksum is retrieved by the metadata service and is compared to the checksum received with the data packet. If the checksums are the same, it is determined that the source data schema has not changed. If the checksums are different, it is determined that the source data schema has changed. In response, the source data schema is updated in the metadata service by, for example, storing the source data schema, the checksum of the source data schema, and a timestamp.

In some examples, consuming applications of the target system 210 (e.g., the analytics application 220, the ML application 222) consume target entities (also referred to as mart entities). In some examples, each target entity conforms to a data model that is defined by a target data schema. In some examples, a target entity can be provided based on one or more source entities. For example, a target entity can be provided based on a source entity. As another example, a target entity can be provided based on multiple source entities (e.g., data of multiple source entities contribute to a target entity).

In some implementations, the data system 204 ingests one or more source entities and the ETL system 230 executes an ETL job on the one or more source entities to provide a target entity. In some examples, the ETL job includes extracting the source entity, transforming the source entity to the target entity, and loading the target entity to a data store (e.g., a data lake). In some examples, extracting can include copying the source entity as raw data from a source system (e.g., the source systems 202a, 202b) to a staging area withing the data system 204. In some examples, transforming can include processing the source entity to transform the source entity to provide the target entity based on the data model of the target entity. In some examples, processing of the source entity can include filtering data, cleansing data, deduplicating data, validating data, authenticating data, performing calculations on the data (e.g., converting currencies or other units of measurement), editing text strings, and formatting the data into tables (or joined tables) in conformance with match the target data schema. In some examples, loading includes loading of the target entity from the staging area to data storage (e.g., a data lake), from which the target entity can be consumed by a consuming application (e.g., the analytics application 220, the ML application 222).

In some examples, each ETL job is executed based on a configuration that includes a set of configuration parameters to define, for example, how the source entity is processed during transformation. In some examples, the configuration can change over time. In some examples, values of one or more configuration parameters can change over time, as needs of the consuming application(s) change, for example. In some examples, the configuration parameters include fields of the target data schema.

In accordance with implementations of the present disclosure, prior to execution of at least a portion of the ETL job, checks are made to determine whether the data model of the target entity is to be updated. As described in further detail herein, checks can include whether a configuration of the ETL job has changed and whether source data schema of one or more source entities have changed. If no changes have occurred, the ETL job is executed. If a change has occurred, the data model of the target entity is updated. In some examples, after the data model of the target entity is updated, the ETL job is executed.

In further detail, a configuration check is performed to determine whether a configuration of the ETL has changed. In some examples, at least a portion of the configuration is provided and is used to calculate a first configuration checksum. For example, the set of fields of the target data schema can be determined from a configuration file. In some examples, the first checksum is generated as a hash value by processing the set of fields through a secure hash algorithm (SHA), a message digest (MD) algorithm, or the like. An example SHA includes, without limitation, SHA-256. In some examples, the first checksum can be described as an expected configuration checksum (e.g., checksum_config_expected). In some implementations, a second checksum corresponding to the last time that the ETL job was executed (e.g., checksum_config_last) and a timestamp indicating when the last execution occurred (e.g., timestamp_ETL) is determined (e.g., from a store within the ETL system 230).

In some implementations, the first checksum is compared to the second checksum. If the first checksum and the second checksum are the same, it is determined that the configuration has not changed. Consequently, the data model of the target entity need not be updated. If the first checksum and the second checksum are different, it is determined that the configuration has changed. Consequently, the data model of the target entity need not be updated.

In some implementations, even if the configuration is not changed, it can still be determined whether the data model of the target entity needs to be updated. In some examples, timestamps of each of the source entities that underly the target entity are provided from the metadata service. Each timestamp indicates when the respective source data schema of the respective source entity was last updated (as described above). In some examples, the timestamp(s) is/are compared to the timestamp indicating when the last execution of the ETL occurred (e.g., timestamp_ETL). If the source data schema was last updated after the last execution of the ETL job, it is determined that the data model of the target entity need be updated. If the source data schema was last updated before the last execution of the ETL job, it is determined that the data model of the target entity need not be updated. By way of non-limiting example, a target entity can be provided based on a first source entity and a second source entity. Respective timestamps (e.g., timestamp_SE1, timestamp_SE2) can be provided (e.g., from the metadata service) and each can be compared to the timestamp indicating when the last execution of the ETL occurred (e.g., timestamp_ETL). In this example, if either timestamp_SE1 or timestamp_SE2 is after timestamp_ETL, it is determined that the respective source data schema of the respective source entity was last updated after the last execution of the ETL job. Consequently, the data model of the target entity need be updated.

In some implementations, if it is determined that the data model of the target entity is to be updated, target metadata (e.g., in CSN) is provided based on the set of fields from the configuration file and the source metadata of the source data schema(s). For example, the configuration file defines which fields of one or more source entities are aggregated to form which fields of the target schema. In some examples, a checksum is provided based on the target metadata (e.g., checksum_target by processing the target metadata through a hash function). In some examples, the checksum is provided as a concatenation of the checksum of the target metadata and checksums of one or more source metadata of the source entit-y/-ies underlying the target entity. For example, source metadata can be retrieved for a source entity from the metadata service (e.g., by executing getMeta (SourceEntity, Realm)). In some implementations, the metadata service stores the target metadata and checksum (e.g., by executing putMeta (TargetEntityType, Realm, targetMeta, checksum)).

In accordance with implementations of the present disclosure, what needs to be updated in the target data schema is determined using an expected target data schema (e.g., provided using the target metadata determined from the configuration and the source metadata) and the last (not updated) target data schema provided from the metadata service. In some examples, the CSN is composed for the current target schema and is compared to what should be in the expected target schema to provide a delta (difference). The delta is used to identify what new fields need to be added to the target storage model. For example, if it is found that a new integer field is identified to be added, then alter table instructions are issued to the database to add the new field.

In some implementations, a schema evolution service is provided that updates the target data schema of a target entity. Updating of the target data schema can include changing the structure of the data model of the target entity (e.g., changing definitions, extending definitions, adding new definitions). In some examples, the schema evolution service executes an update schema function. For example, the schema evolution service can expose an application programming interface (API) that can be used to call the schema evolution service (e.g., updateSchema (Realm, TargetEntityType, UpdateInstructions). In some examples, the schema evolution service updates the target data schema by executing update instructions (e.g., UpdateInstruction=CREATE (details), ADDColumn (details)). In some examples, the updated target data schema then sent back to the metadata service for storage to be the new baseline.

In some implementations, after the target data schema is updated, the ETL job completes execution based on the target data schema. For example, the ETL job transforms data of the source entit-y/-ies to provide the target entity based on the (updated) target data schema, and loads the target entity into a data store (e.g., a data lake). In this manner, one or more consuming applications can consume the target entity.

Figure 3:
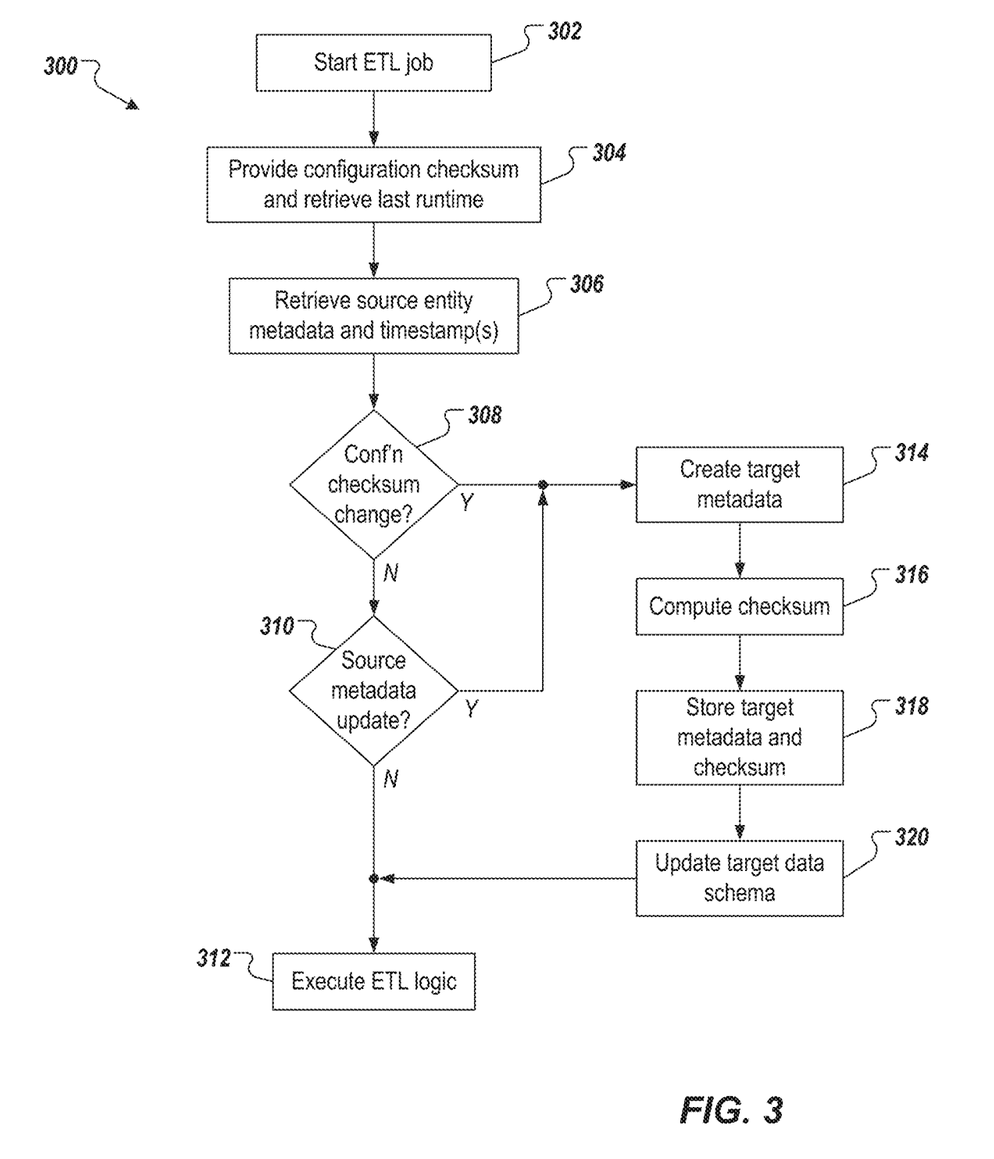
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

An ETL job is started (302). For example, and as described herein, the ETL system 230 can initiate execution of the ETL job to provide a target entity from one or more source entities. A configuration checksum is provided and a last runtime is retrieved (304). For example, and as described herein, at least a portion of the configuration is provided and is used to calculate a first configuration checksum. For example, the set of fields of the target data schema can be determined from a configuration file to provide the configuration checksum as a first checksum (e.g., generated as a hash value). In some examples, the first checksum can be described as an expected configuration checksum (e.g., checksum_config_expected). In some implementations, a second checksum corresponding to the last time that the ETL job was executed (e.g., checksum_config_last) and a timestamp indicating when the last execution occurred (e.g., timestamp_ETL) is determined (e.g., from a store within the ETL system 230). Source entity metadata and associated timestamp(s) are retrieved (306). For example, and as described herein, source entity metadata and respective timestamps (e.g., timestamp_SE1, timestamp_SE2) can be provided (e.g., from the metadata service). For example, source metadata can be retrieved for a source entity from the metadata service (e.g., by executing getMeta (SourceEntity, Realm)).

It is determined whether there is a change in the configuration checksum (308). For example, and as described herein, the first checksum (e.g., checksum_config_expected) is compared to the second checksum (e.g., checksum_config_last). If the first checksum and the second checksum are the same, it is determined that the configuration has not changed. If there is not a change in the configuration checksum, it is determined whether the source data schema(s) has/have changed (310). For example, and as described herein, respective timestamps (e.g., timestamp_SE1, timestamp_SE2 from the metadata service) each can be compared to the timestamp indicating when the last execution of the ETL occurred (e.g., timestamp_ETL). In this example, if either timestamp_SE1 or timestamp_SE2 is after timestamp_ETL, it is determined that the respective source data schema of the respective source entity was last updated after the last execution of the ETL job.

If there is no change in the source data schema(s), the ETL logic is executed (312). For example, and as described herein, the ETL system 230 completes execution of the ETL job based on the (existing) target data schema. For example, the ETL job transforms data of the source entit-y/-ies to provide the target entity based on the (existing) target data schema and loads the target entity into a data store (e.g., a data lake).

If there is a change in the configuration checksum or there is a change in a source data schema, target metadata for the target entity is created (314). For example, and as described herein, target metadata (e.g., in CSN) is provided based on the set of fields from the configuration file and the source metadata of the source data schema(s). A checksum is computed (316) and the target metadata and the checksum are stored (318). For example, and as described herein, a checksum is provided based on the target metadata (e.g., checksum_target by processing the target metadata through a hash function). In some examples, the checksum is provided as a concatenation of the checksum of the target metadata and checksums of one or more source metadata of the source entit-y/-ies underlying the target entity. In some implementations, the metadata service stores the target metadata and checksum (e.g., by executing putMeta (TargetEntityType, Realm, targetMeta, checksum)).

The target data schema is updated (320). For example, and as described herein, a schema evolution service can be called through an API (e.g., updateSchema (Realm, TargetEntityType, UpdateInstructions). In some examples, the schema evolution service updates the target data schema by executing update instructions (e.g., UpdateInstruction=CREATE (details), ADDColumn (details)).

The ETL logic is executed (312). For example, and as described herein, the ETL system 230 completes execution of the ETL job based on the (updated) target data schema. For example, the ETL job transforms data of the source entit-y/-ies to provide the target entity based on the (updated) target data schema and loads the target entity into a data store (e.g., a data lake).

Figure 4:
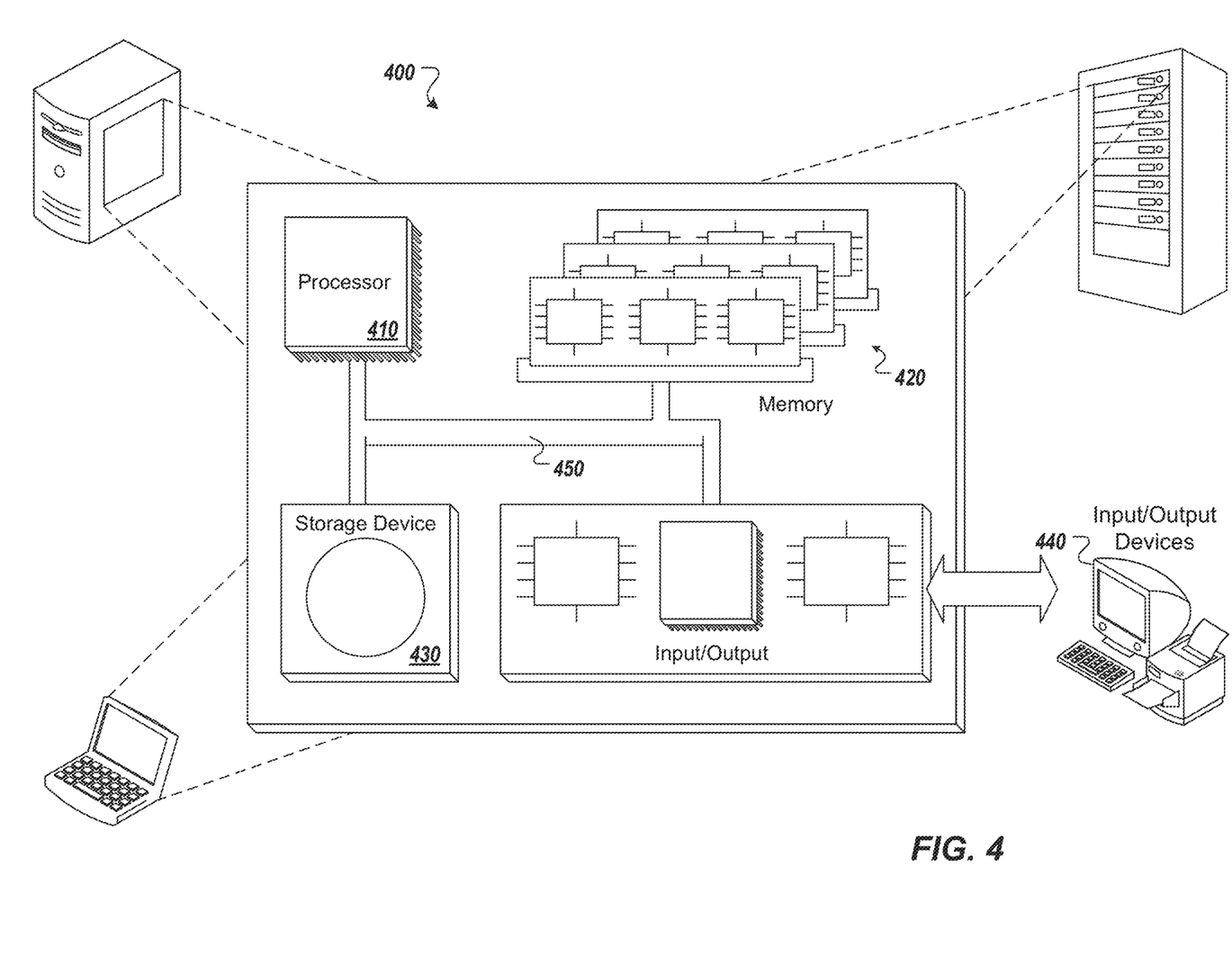
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for updating a data model of a target entity for consumption by one or more consuming applications, the method being executed by one or more processors and comprising:
    generating an expected configuration checksum based on a configuration file associated with an extraction, transformation, and loading (ETL) job, the ETL job being executable to provide a target entity for consumption by one or more consuming applications, the target entity comprising data of one or more source entities;
    retrieving an ETL timestamp indicating a last time that the ETL job was executed;
    determining, based on one of the expected configuration checksum and the ETL timestamp, that a target data schema of the target entity is to be updated, and in response:
        providing target metadata for the target entity, and
        updating the target data schema based on the target metadata to provide an updated target data schema;
    generating the target entity based on the target data schema; and
    loading the target entity as a data object into a data store for consumption by at least one of the one or more consuming applications.

2. The method of claim 1, further comprising executing the ETL job using the updated target schema to generate and load the target entity.

3. The method of claim 1, wherein the updated target schema is generated by a schema evolution service that executes update instructions.

4. The method of claim 1, wherein generating the expected configuration checksum comprises processing a set of fields provided for in the configuration file through a hash function.

5. The method of claim 1, wherein providing target metadata for the target entity comprises retrieving source metadata of each of the one or more source entities and generating the target metadata at least partially based on the source metadata.

6. The method of claim 1, wherein determining that the target data schema of the target entity is to be updated comprises determining that the expected configuration checksum is different from a stored checksum.

7. The method of claim 1, wherein determining that the target data schema of the target entity is to be updated comprises determining that the ETL timestamp is earlier than a timestamp representing an update of a source data schema of at least one of the source entities.

8. A non-transitory computer-readable storage medium coupled to one or more processors and having instructions stored thereon which, when executed by the one or more processors, cause the one or more processors to perform operations for updating a data model of a target entity for consumption by one or more consuming applications, the operations comprising:
generating an expected configuration checksum based on a configuration file associated with an extraction, transformation, and loading (ETL) job, the ETL job being executable to provide a target entity for consumption by one or more consuming applications, the target entity comprising data of one or more source entities;
retrieving an ETL timestamp indicating a last time that the ETL job was executed; and
determining, based on one of the expected configuration checksum and the ETL timestamp, that a target data schema of the target entity is to be updated, and in response:
providing target metadata for the target entity, and
updating the target data schema based on the target metadata to provide an updated target data schema;
generating the target entity based on the target data schema; and
loading the target entity as a data object into a data store for consumption by at least one of the one or more consuming applications.

9. The non-transitory computer-readable storage medium of claim 8, wherein operations further comprise executing the ETL job using the updated target schema to generate and load the target entity.

10. The non-transitory computer-readable storage medium of claim 8, wherein the updated target schema is generated by a schema evolution service that executes update instructions.

11. The non-transitory computer-readable storage medium of claim 8, wherein generating the expected configuration checksum comprises processing a set of fields provided for in the configuration file through a hash function.

12. The non-transitory computer-readable storage medium of claim 8, wherein providing target metadata for the target entity comprises retrieving source metadata of each of the one or more source entities and generating the target metadata at least partially based on the source metadata.

13. The non-transitory computer-readable storage medium of claim 8, wherein determining that the target data schema of the target entity is to be updated comprises determining that the expected configuration checksum is different from a stored checksum.

14. The non-transitory computer-readable storage medium of claim 8, wherein determining that the target data schema of the target entity is to be updated comprises determining that the ETL timestamp is earlier than a timestamp representing an update of a source data schema of at least one of the source entities.

15. A system, comprising:
a computing device; and
a computer-readable storage device coupled to the computing device and having instructions stored thereon which, when executed by the computing device, cause the computing device to perform operations for updating a data model of a target entity for consumption by one or more consuming applications, the operations comprising:
generating an expected configuration checksum based on a configuration file associated with an extraction, transformation, and loading (ETL) job, the ETL job being executable to provide a target entity for consumption by one or more consuming applications, the target entity comprising data of one or more source entities;
retrieving an ETL timestamp indicating a last time that the ETL job was executed; and
determining, based on one of the expected configuration checksum and the ETL timestamp, that a target data schema of the target entity is to be updated, and in response:
providing target metadata for the target entity, and
updating the target data schema based on the target metadata to provide an updated target data schema;
generating the target entity based on the target data schema; and
loading the target entity as a data object into a data store for consumption by at least one of the one or more consuming applications.

16. The system of claim 15, wherein operations further comprise executing the ETL job using the updated target schema to generate and load the target entity.

17. The system of claim 15, wherein the updated target schema is generated by a schema evolution service that executes update instructions.

18. The system of claim 15, wherein generating the expected configuration checksum comprises processing a set of fields provided for in the configuration file through a hash function.

19. The system of claim 15, wherein providing target metadata for the target entity comprises retrieving source metadata of each of the one or more source entities and generating the target metadata at least partially based on the source metadata.

20. The system of claim 15, wherein determining that the target data schema of the target entity is to be updated comprises determining that the expected configuration checksum is different from a stored checksum.

* * * * *